United States Patent [19]
Ashworth

[11] Patent Number: 4,731,894
[45] Date of Patent: Mar. 22, 1988

[54] ORBITAL POLISHING SYSTEM

[75] Inventor: Lewis A. Ashworth, Orange, Calif.

[73] Assignee: BAF Industries, Santa Ana, Calif.

[21] Appl. No.: 862,614

[22] Filed: May 13, 1986

[51] Int. Cl.$^4$ .......................... A47L 11/12; B60S 3/06; A46B 13/00

[52] U.S. Cl. ...................................... 15/97 R; 15/230

[58] Field of Search .............. 15/97 R, 98, 97 A, 230, 15/230.18, 230.19, 244 B; 51/358

[56] References Cited

U.S. PATENT DOCUMENTS

| | | | |
|---|---|---|---|
| 3,027,585 | 4/1962 | Freedman et al. | 15/230.19 |
| 3,102,294 | 9/1963 | Miller et al. | 15/97 R |
| 3,531,812 | 10/1970 | Bailey et al. | 15/97 R |
| 4,177,535 | 12/1979 | Cole | 15/97 R |
| 4,188,682 | 2/1980 | Burglin et al. | 15/97 R |

FOREIGN PATENT DOCUMENTS

| | | | |
|---|---|---|---|
| 2740574 | 4/1978 | Fed. Rep. of Germany | 51/358 |
| 474334 | 9/1952 | Italy | 15/97 R |
| 1168407 | 10/1969 | United Kingdom | 15/97 R |

*Primary Examiner*—Edward L. Roberts
*Attorney, Agent, or Firm*—Walter A. Hackler

[57] ABSTRACT

An orbital polishing system includes the drive motor assembly for orbitally rotating a buffing pad. The buffing pad includes contour means for defining a groove on a periphery thereof for supporting a buffing cloth thereon and an elastic O-ring is sized for holding the buffing cloth in the groove of the periphery of the buffing pad and operative with the groove for decreasing tension between the buffing pad and the buffing cloth on one side of the buffing pad as the buffing pad is orbitally rotated and pinching the buffing cloth into the groove on an opposite side of the buffing pad as the buffing pad is orbitally rotated in order to cause the buffing cloth to achieve and maintain a taut configuration across the face of the buffing pad.

21 Claims, 4 Drawing Figures

ORBITAL POLISHING SYSTEM

The present invention is generally directed to portable polishing machines and systems and, more paticularly, is directed to an orbital polishing system useful for removing oxides and old wax from painted surfaces, such as automobiles, and the wax buffing of such surfaces.

The industry associated with the cleaning and polishing of automobiles has continually searched for compositions, apparatus and systems for facilitating the maintenance of an automobile finish.

Professional car detailers and garages have long used electric buffers and the like to replace or supplement hand polishing of automobile surfaces.

In general, these are two types of polishing machines, or buffers, in popular use—the rotating buffer and the orbital buffer. As the names imply, the rotating buffer utilizes a buffing pad coaxially driven by a motor while the oribital buffer utilizes a buffing pad driven in an elliptical pattern.

Some buffers use a rug-like buffing pad which is bolted or mechanically linked to the drive motor while others use a permanently mounted flexible pad over which a polishing cloth is disposed for buffing purposes.

Orbital buffers are preferred to rotary buffers because they do not leave undesirable arcuate-type marks on the buffed surface as do rotary buffers. Additionally, it is preferable to use the polishing cloth-pad system because of the ease in replacing the polishing cloth either because it has become loaded with wax or to change to a different texture, as may be necessary during the buffing procedure.

Heretofore, orbital buffers using changeable buffing cloths have not been employed for the first step of restoration of an automobile finish, namely, the removal of old wax and oxides, because the buffing cloth would not remain on the orbitally driven pad under the pressure necessary to remove the oxides or would crease and fold.

Consequently, car detailers and garages have had to invest and maintain twice the number of buffers than would be necessary if a single buffer could be used throughout the process of restoring an automobile finish.

As hereinbefore pointed out, one of the problems with an orbital buffer is the fact that the buffing cloth tends to be thrown off the buffing pad because of the orbital action thereof.

This is particularly true if the buffer is started before it is applied to the surface to be polished or cleaned. During the final buffing, it is desirable to have a cloth which can be easily replaced which has a nap and a density suitable for final polishing. However, the final surface is usually instantly marred if the cloth is separated from the buffing pad and the buffing pad itself touches the surface. Additionally, streaks and finish blemishes can be caused by a folding, or wrinkling, of the buffing cloth between the surface being polished and the buffing pad.

Hence, there is a need for a polishing system which can provide for the advantages of using orbitally rotating buffing pad, while at the same time utilizing a fine buffing cloth which can be easily changed and which is not wrinkled, creased or thrown off the orbital buffer as it is operated. Further, there is a need for using such an orbital buffer with a buffing cloth that is suitable for cleaning oxides or old wax off the painted surface. Such a system would enable a detailer, or a garage, to eliminate their need for more than one type of buffer because all of the paint restoration steps could be accomplished with the use of a single orbital buffer.

SUMMARY OF THE INVENTION

In accordance with the present invention, an orbital polishing system includes a drive motor assembly for orbitally rotating a buffing pad, and a buffing pad having a face and a periphery thereabout.

Resilient means are provided for holding a buffing cloth against the buffing pad periphery, with said resilient means being operative for tightly holding the buffing cloth against one side of the buffing pad periphery and releasing the buffing cloth from an opposite side of the buffing pad periphery, as the buffing pad, buffing pad cloth, and resilient means are orbitally rotated by the drive motor assembly means. This arrangement causes the buffing cloth to achieve and maintain a taut configuration across the face of the buffing pad.

This taut configuration eliminates creasing, or folding, of the buffing cloth which may cause streaks or marring of a surface being buffed as may occur with prior art devices.

In addition, in accordance with the present invention, means for preventing the resilient means from moving in a direction perpendicular to the plane of the orbital rotation of the buffing pad are provided.

More particularly, the orbital buffing system according to the present invention, includes a buffing pad having a periphery, which is a cylindrical surface, and the resilient means for holding the buffing cloth against the buffing pad periphery includes an elastic band.

The means for preventing the elastic band from moving in a direction perpendicular to the plane of the orbital rotation of the buffing pad includes a groove in the buffing pad's cylindrical surface.

In order to enable the elastic band and a groove to cooperate with one another in an operative manner, the elastic band may comprise an O-ring having a circular cross-section and the groove may include a contour having a semicircular cross-section which is sized to accept the O-ring with a buffing cloth therebetween.

Additionally, the buffing cloth may be sized for loosely fitting over the buffing pad face and periphery as well as a portion of the back side of the buffing pad. Biasing means are providing for gathering the buffing cloth toward the center of the buffing pad on the back side thereof.

This elastic band means may be sewn into the buffing cloth and operable for stretching when the buffing pad is orbitally rotated and enabling the buffing cloth on the buffing pad's back side to move away from the center by centrifugal force.

In order to further stabilize the orbital action, the buffing pad may include means defining a recessed portion on the back side thereof and the drive motor assembly includes a counter-weight disposed within the recessed portion.

More particularly stated, an orbital polishing system, in accordance with the present invention, includes a drive motor assembly for orbitally rotating a buffing pad. The buffing pad includes contour means for defining a groove on a periphery thereof for supporting a buffing cloth therein.

Elastic means are sized for holding the buffing cloth in the groove of the periphery of the buffing pad and operative with the contour means for decreasing tension between the buffing pad and the buffing cloth on one side of the buffing pad as the buffing pad is orbitally rotated, and pinching the buffing cloth into the groove on an opposite side of the buffing pad as the buffing pad is orbitally rotated in order to cause the buffing cloth to achieve and maintain a taut configuration across the face of the buffing pad.

BRIEF DESCRIPTION OF THE DRAWINGS

The advantages and features of the present invention will appear from the following description when considered in conjunction with the accompanying drawings in which.

DETAILED DESCRIPTION

Figure 1:
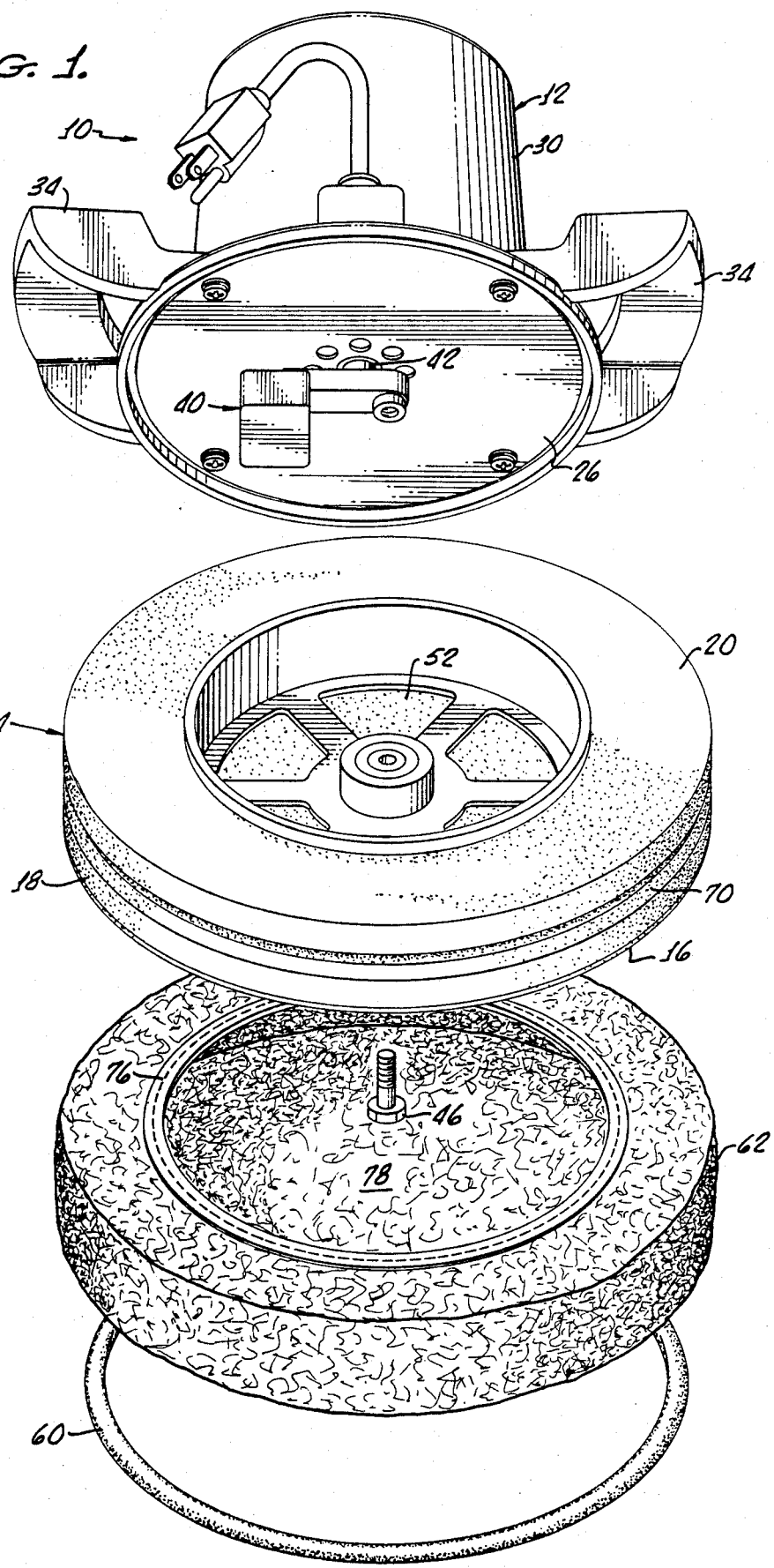
FIG. 1, is an exploded perspective view of an orbital polishing system, in accordance with the present invention, generally showing a drive motor assembly, a buffing pad and a buffing cloth.

Turning now to FIG. 1, there is illustrated an orbital polishing system 10, in accordance with the present invention, generally showing a drive motor assembly 12 and a buffing pad 14 having a face 16 thereon with a cylindrical peripheral surface 18 and a back side 20.

Figure 2:
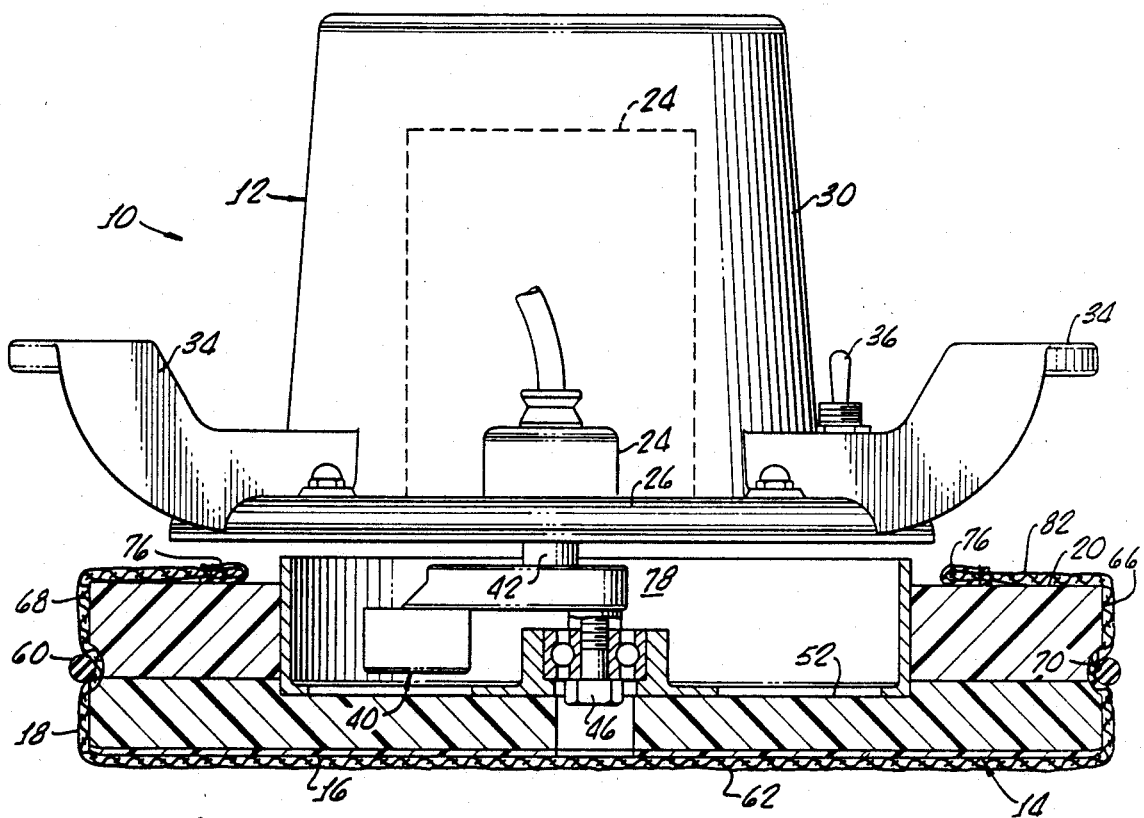
FIG. 2, is a cross-sectional view of an orbital polishing system, in accordance with the present invention.

The drive motor assembly may be of any suitable shape and generally includes an electrical motor 24 (See FIG. 2) fixed to a mounting plate 26 to which a housing 30 may be attached by any suitable means.

Handles 34 may be attached to, or formed into, the housing 30 for easy gripping and handling of the orbital polishing system 10, and an electrical switch 36 may be provided to control power to the electrical motor in a conventional manner.

Attached to the motor 24 is a conventional counterbalance assembly 40, which is adapted for mounting to the motor shaft 42 and to the pad 14 by means of a bolt 46.

It should be appreciated that this mounting system is conventional and that both the motor shaft 42 and the buffing pad 14 are free to rotate independently on the counter-weight. However, when the motor shaft 42 is rotated, the rotation of the counter-weight and the pad 14 therein imparts an orbital action to the buffing pad 14.

It is important, however, that the counter-weight is mounted within a recess 52 in order to cause the counter-weight to have a central location within the pad to better define and control the orbital action thereof.

The buffing pad 14 may be formed of any suitable soft material, such as a foam, or a graded foam, which gradually increases in density from the back side 20 to the face 16 thereof.

An elastic O-ring 60 provides means for holding a buffing cloth 62 against the buffing pad periphery 18, while the pad is orbitally rotated up to 2800 RPM by the motor 24. Since the diameter of the buffing pad may be in the neighborhood of 12 inches or more, considerable forces act to throw the buffing cloth 62 off of the buffing pad 14.

However, the elastic O-ring 60 is operative for tightly holding the buffing cloth 62 against "one side" 66 of the buffing pad periphery 18 and releasing the buffing cloth 62 from an "opposite side" 68 of the buffing pad periphery 18 when the buffing cloth 62, buffing pad 14 and O-ring 60 are orbitally rotated by the drive motor assembly 12.

In order to prevent motion of the O-ring 62 in a direction perpendicular to the plane of orbital rotation, contour means such as a groove 70, is provided in the buffing pad periphery 18.

To initially hold the buffing cloth onto the pad so that it extends over the face 16, the periphery 18 and a portion of the back side 20, biasing means, consisting of an elastic band 76, is sewn into the buffing cloth 62 in order to gather the buffing pad cloth toward the center 78 of the buffing pad 14.

Figure 3:
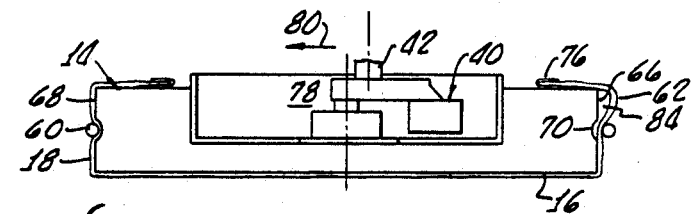
FIGS. 3 and 4, are diagrammatic cross-sectional views of the buffing pad, as it is orbitally rotated, for showing an elastic band and a groove operating in concert to cause the buffing cloth to achieve and maintain a taut configuration across the face of the buffing pad.
Figure 4:
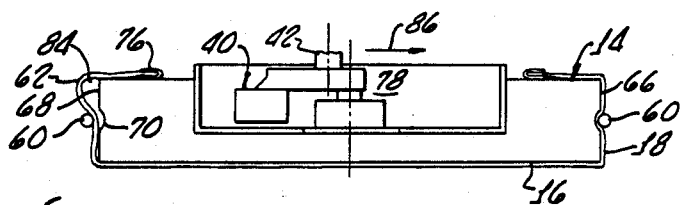

The operation of the elastic O-ring 60 and the groove 70 can be more clearly appreciated with reference to FIGS. 3 and 4.

As shown in FIG. 3, as the buffing pad 16 is moved in one direction, indicated by the arrow 80, by the drive motor assembly 12, the action has the effect of decreasing the tension between the O-ring 60 and the groove 70 on "one side" 66 of the buffing pad periphery 18, and thereby allowing the buffing cloth 62 to separate from and pull away from the buffing pad periphery. This is illustrated in FIG. 3 by the position of a back portion 82 of the buffing cloth 62 and a gap 84 forming between the buffing pad 62 and "one side" of the periphery 18.

At the same time, on the "opposite side" 68 of the pad, the cloth 62 is pinched firmly into the groove 70 by the O-ring 60.

The opposite is true when the effective movement of the pad is in an opposite direction, indicated by the arrow 86, as shown in FIG. 4.

In this instance, the cloth 62 is pinched into the groove 70 on the "one side" 66 of the pad periphery 18 and loosened on the "opposite side" 68. In this manner, the buffing cloth 62 achieves and continually maintains a taut configuration across the face 16 of the buffing pad 14.

It should be appreciated that the elliptical or orbital movement is not fully illustrated in FIGS. 3 and 4 and that the directional arrows 80, 86 merely indicate opposing movement of the buffing pad 14 and are not indicative of the exact movement of the buffing pad when the forces occur on the buffing cloth 62 and O-ring 60 to cause the self-tightening features of the buffing cloth 62 in accordance with the present invention.

While it is evident that a number of cross-sections may be utilized for the O-ring as well as the groove, a preferred embodiment utilizes an O-ring with a circular cross-section and the groove 70 has a contour which is approximately equal to a semicircle and sized to accommodate the O-ring with the buffing cloth 62 therebetween.

Because of the continual maintenance of tension in the buffing cloth across the face of the buffing pad, it is apparent that more force can be tolerated by way of frictional engagement of the buffing pad with a surface, not shown, without folding, wrinkling or creasing of the buffing pad.

The buffing cloth may be made of any suitable well known buffing material for the final buffing of automobile surfaces.

However, in addition, the buffing cloth may be of any suitable nature for the removal of oxides from the finish of painted surfaces because of the enhanced controllability of the buffing cloth on the orbitally rotated buffing pad 14 which prevents folding and creasing of the buffing pad and, importantly, prevents separation of the buffing cloth and the pad as has been experienced with prior art orbital buffers.

Although there has been described hereinabove a specific arrangement of an orbital buffing system in accordance with the present invention for purposes of illustrating the manner in which the invention may be used to advantage, it should be appreciated that the invention is not limited thereto. Accordingly, any and all modifications, variations or equivalent arrangements, which may occur to those skilled in the art, should be considered to be within the scope of the invention as defined in the appended claims.

What is claimed is:

1. An orbital polishing system comprising:
   drive motor assembly means for orbitally rotating a buffing pad;
   a buffing pad having a face and a periphery thereabout;
   resilient means for tightly holding a buffing cloth against one side of the buffing pad periphery and releasing the buffing cloth from an opposite side of the buffing pad periphery in response to orbital rotation of the buffing pad, buffing cloth and resilient means by the drive motor assembly means causing the buffing cloth to achieve and maintain a taut configuration across the face of the buffing pad; and,
   means for preventing said resilient means from moving in a direction perpendicular to the plane of orbital rotation of the buffing pad.

2. The orbital polishing system according to claim 1 wherein the buffing pad periphery comprises a cylindrical surface.

3. The orbital polishing system according to claim 2 wherein said resilient means comprises an elastic band.

4. The orbital polishing system according to claim 3 wherein the means for preventing the elastic band from moving in a direction perpendicular to the plane of orbital rotation of the buffing pad comprises a groove in the buffing pad cylindrical surface.

5. The orbital polishing system according to claim 4 wherein the elastic band comprises an O-ring having a circular cross-section and said groove includes a contour having a semicircular cross-section sized to accept the O-ring with the buffing cloth therebetween.

6. The orbital polishing system according to claim 5 wherein said buffing cloth is sized for loosely fitting over the buffing pad face and periphery as well as a portion of a back side thereof and includes biasing means for gathering the buffing cloth toward the center of the buffing pad on the back side thereof.

7. The orbital polishing system according to claim 6 wherein said biasing means includes an elastic band means sewn into the buffing cloth for stretching when the buffing pad is orbitally rotated and enabling the buffing cloth on the buffing pad back side to move away from the center by centrifugal force.

8. The orbital polishing system according to claim 7 wherein the buffing pad includes means defining a recessed portion in the back side thereof and said drive motor assembly means includes a counter-weight disposed within said recessed portion.

9. An orbital polishing system comprising:
   drive motor assembly means for orbitally rotating a buffing pad;
   a buffing pad having a face and adapted for receiving a buffing cloth thereabout and including contour means for defining a groove on a periphery thereof for supporting the buffing cloth therein; and,
   elastic means for both decreasing tension between the buffing pad and the buffing cloth on one side of buffing pad and pinching the buffing cloth into the groove on an opposite side of the buffing pad in response to orbital rotation of the buffing pad causing the buffing cloth to achieve and maintain a taut configuration across the face of the buffing pad.

10. The orbital polishing system according to claim 9 wherein the buffing pad includes means defining a recessed portion in a back side thereof and said drive motor assembly means includes a counter-weight disposed within said recessed portion.

11. The orbital polishing system according to claim 10 wherein the buffing pad periphery comprises a cylindrical surface.

12. The orbital polishing system according to claim 11 wherein said means for holding a buffing cloth against the buffing pad periphery comprises an elastic O-ring.

13. The orbital polishing system according to claim 12 wherein said groove includes a contour having a semicircular cross-section sized to accept the O-ring with the buffing cloth therebetween.

14. An orbital polishing system comprising:
    drive motor assembly means for orbitally rotating a buffing pad;
    a cylindrical buffing pad interconnected with said drive motor assembly means and having a back side and a face and adapted for receiving a buffing cloth thereabout, said cylindrical buffing pad means including contour means for defining a groove on a periphery thereof for supporting the buffing cloth therein;
    a buffing cloth sized for loosely fitting over the buffing pad face and periphery as well as a portion of the back side of the buffing pad and having biasing means for gathering the buffing cloth toward the center of the buffing pad on the back side thereof; and,
    elastic means cooperating with said biasing means and said contour means for causing the buffing cloth to achieve and maintain a taut configuration across the face of the buffing pad in response to orbital rotation of the buffing pad and buffing cloth.

15. The orbital polishing system according to claim 14 wherein said biasing means includes an elastic band means sewn into the buffing cloth for
    enabling the buffing cloth on the buffing pad back face to move away from the center by centrifugal force.

16. The orbital polishing system according to claim 15 wherein said elastic means comprises a rubber-like O-ring having a generally round cross-section and said groove has a generally semi-circular contour.

17. The orbital polishing system according to claim 16 wherein the buffing pad periphery comprises a cylindrical surface.

18. The orbital polishing system according to claim 17 wherein the buffing pad includes means defining a recessed portion in the back side thereof and said drive motor assembly means includes a counter-weight disposed within said recessed portion and between said biasing means.

19. An orbital polishing system comprising:
drive motor assembly means for orbitally rotating a buffing pad and buffing cloth;
a buffing pad having a face and a periphery thereabout and configured for attachment to said drive motor assembly;
resilient means for causing the buffing cloth to achieve and maintain a taut configuration across the face of the buffing pad in response to the orbital rotation of the buffing pad and buffing cloth.

20. The orbital polishing system according to claim 19 wherein said resilient means comprises an elastic O-ring sized for stretching around the periphery of the buffing pad with the buffing cloth therebetween and elastic band means for gathering the buffing cloth toward the center of the buffing pad when the buffing cloth is disposed over the buffing pad.

21. The orbital polishing system according to claim 20 wherein the buffing pad includes means defining a groove in the periphery thereof, said groove and O-ring being sized to enable the O-ring to force a portion of the buffing cloth into the groove.

* * * * *